United States Patent [19]

Fukunaga et al.

[11] Patent Number: 5,374,493
[45] Date of Patent: Dec. 20, 1994

[54] COLOR FILTER AND METHOD OF FABRICATING A COLOR FILTER

[75] Inventors: Tetsuya Fukunaga, Sagamihara; Toshihiko Koseki, Yokohama; Toshihiro Ueki, Kawasaki; Hidemine Yamanaka, Yamato; Kesanao Kobayashi, Shizuoka, all of Japan

[73] Assignee: International Business Machines Corporation, Armonk, N.Y.

[21] Appl. No.: 918,310

[22] Filed: Jul. 22, 1992

[30] Foreign Application Priority Data

Sep. 5, 1991 [JP] Japan ................. 3-226150

[51] Int. Cl.$^5$ ............................. G03F 9/00
[52] U.S. Cl. ............................. 430/7; 359/68
[58] Field of Search ................. 430/7; 359/68

[56] References Cited

U.S. PATENT DOCUMENTS 4,781,444 11/1988 Suginoya et al. ............ 359/357
4,934,791 6/1990 Shimizu et al. ............... 359/68
5,085,973 2/1992 Shimizu et al. ............... 430/271

Primary Examiner—Marion E. McCamish
Assistant Examiner—Mark A. Chapman
Attorney, Agent, or Firm—Ronald L. Drumheller

[57] ABSTRACT

The present invention is a color filter and method of making a color filter in which a reactive dye is added to a photosensitive composite, which contains pigment to form the color filter, and the reactive dye reacts with the binder polymer of the photosensitive composite to form a color filter having a high contrast color filter. The photosensitive composite, which has a primary color and which contains the product of the binder polymer and the reactive dye, is deposited on a glass substrate over a shielding layer. A layer of PVA is then deposited on the photosensitive composite layer. A masking layer then defines the area of the specific primary color for the photosensitive composite. This process is then repeated for the remaining primary colors of the color filter. The color filter produced by this process has a very high contrast ratio.

10 Claims, 5 Drawing Sheets

COLOR FILTER AND METHOD OF FABRICATING A COLOR FILTER

FIELD OF THE INVENTION

The present invention relates generally to a color filter and a method of fabricating color filters. Specifically, the present invention relates to color filters used for a color liquid crystal display apparatus.

BACKGROUND OF THE INVENTION

In general, there are several methods for making a color filter used for a color liquid crystal display apparatus such as dyeing, dispersion, electrodeposition, and printing. These techniques for making a color filter are roughly divided into the following two groups: one uses dye and the other uses pigment as an agent for coloring. The dyeing and pigmentation mechanisms for coloring are similar to each other, however, both methods are very different from each other in that dye is dissolved in a fabricating process for a color filter and is present in the order of molecules in the color filter, while pigment disperses as particles of about 0.1 micron since the pigment is not dissolved into the solvent.

A color filter including pigments has many advantages, however, some kinds of pigments degrade polarization of light and thereby cause a problem of significantly degrading the display contrast ratio as discussed in "A Color Filter for 512-Color Displaying 10.4" Sized TFT-LCD" of, Proceedings of the 7th Joint Conference on Color Technology, Color Engineering Conference Papers 5.2 on the Seventh International Symposium Associated Four Optical Societies, 1990. This problem is thought to be caused by scattering, double birefregence, etc., however, this problem has not yet been quantitatively explained. In spite of the lack of quantitative explanation, providing a high contrast display is a significant problem which should be solved. Moreover, the use of dyes in color filters is difficult because of the lack of stability of the dye in the color filter. Therefore, if a color filter can be developed which has color stability and small depolarization, this would be very advantageous to the contrast of display.

OBJECTS OF THE INVENTION

It is an object of the present invention to manufacture a color filter for a liquid crystal display having a high contrast ratio.

It is a further object of the present invention to manufacture a color filter for a liquid crystal display having a high contrast ratio and having small depolarization.

It is another object of the present invention to manufacture a color filter for a liquid crystal display having a high contrast ratio, small depolarization, and stable color.

It is still a further object of the present invention to develop a manufacturing process to make a color filter for a liquid crystal display having a high contrast ratio, small depolarization, and stable color.

SUMMARY OF THE INVENTION

The present invention is a color filter and method of making a color filter in which a reactive dye is added to a photosensitive composite, which contains pigment to form the color filter, and the reactive dye reacts with the binder polymer of the photosensitive composite to form a color filter having a high contrast color filter. The photosensitive composite, which has a primary color and which contains the product of the binder polymer and the reactive dye, is deposited on a glass substrate over a shielding layer. A layer of PVA is then deposited on the photosensitive composite layer. A masking layer then defines the area of the specific primary color for the photosensitive composite. This process is then repeated for the remaining primary colors of the color filter. The color filter produced by this process has a very high contrast ratio.

DETAILED DESCRIPTION OF THE PREFERRED EMBODIMENT

Figure 1:
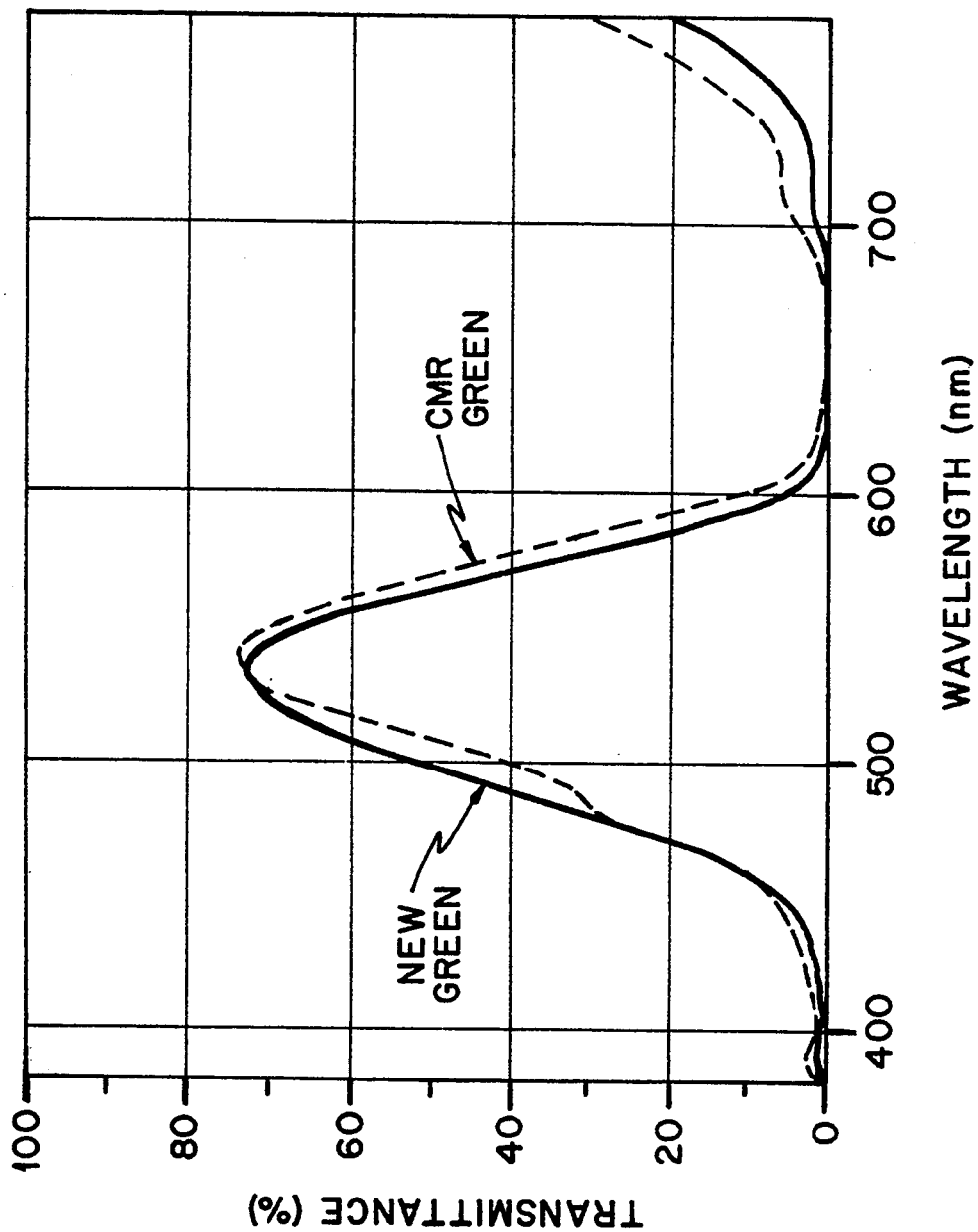
FIG. 1 illustrates a comparison of the spectrum of a color filter fabricated by using new green (the present invention) with that of a color filter fabricated by using CMR-green.

The present invention is based on the fact that if reactive dye is added to a photosensitive composite for a color filter containing pigment and the reactive dye reacts with binder polymer, which is a constituent of the photosensitive composite to form a binder polymer-reactive dye bonding substance, a high contrast displayable color filter can be obtained.

That is, the present invention provides a color filter characterized in that it contains a substance obtained by the reaction of the binder polymer with the reactive dye. A composite of a photosensitive constituent for forming a pattern and color material for coloring the pattern involves the problems of elution and fading in processes other than the first coloring if the color material is acid dye or disperse dye. Therefore, it is desirable to dissolve the reactive dye into the binder polymer to bond the reactive dye with the binder polymer by heating, and to use a substance thus obtained to form a color filter.

The reaction of the reactive dye with the binder polymer is roughly divided, according to a kind of reactive dye, into the following three: The first reaction is the reaction of reactive dye containing a vinyl sulfone group as a reactive group with the binder polymer in which nucleophilic addition takes place.

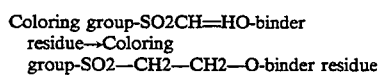

In the reaction, a reactive group on the side of the binder is a hydroxyl group (—OH) shown in the above chemical formula or an amino group (—NH3). A reactive group on the side of the dye is the vinyl sulfone group shown in the above chemical formula, or a sulfatoethyl sulfonyl group (—SO2—CH2CH2—OSO3H) that changes into the vinyl sulfone group and the like.

The second reaction is the reaction of reactive dye containing a nucleophilic substitution group as a reactive group with the binder polymer in which nucleophilic substitution takes place.

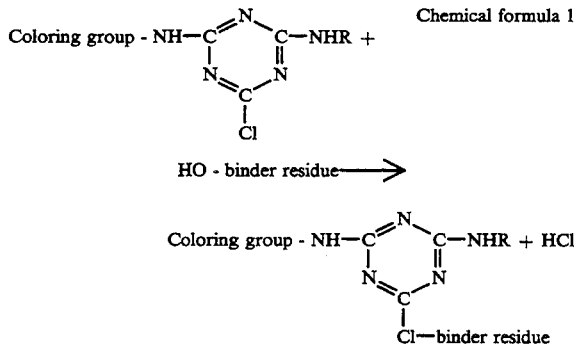

Chemical formula 1

In the second reaction, a reactive group on the side of the binder is a hydroxyl group or an amino group the same as in the first reaction and nucleophilic substitution groups, which are reactive groups in the reactive dye, are triazine series, pyrimidine series, quinoxaline series, phosphonic acid series, etc. The third reaction is a reaction of type of the above two mixed reactions or a reaction in which plural reactive groups exist. All reactions take place at a temperature of about 40 C. to 60 C., can take place before the reactive dye and the binder polymer are applied, or can take place in prebaking after a resist is applied.

The reaction of the dye with the binder forms a covalent bond between them Thereby, the dye is not dissolved in succeeding processes after the first coloring and thus the color filter can be formed. To the photosensitive composite used as a base of the color filter, a photoporimerized composite comprising addition polymerization unsaturated monomer, photopolymerization initiator, and binder, which is disclosed by U.S. Pat. No. 3,549,367 which is hereby incorporated by reference, is useful. The detailed discussion is found in the following.

An addition polymerization unsaturated monomer is a compound which contains at least one ethylene unsaturated group that can be polymerized by an addition polymerization process and the boiling point of which is above 100 C. at the ordinary pressure. Examples of such a monomer are monofunctional acrylate or methacrylate such as polyethylene glycol mono arcylate (or methacrylate), polypropylene glycol mono acrylate (or methacrylate), or phenoxyethyl acrylate (or methacrylate), etc.; an acrylate (or methacrylate) substance obtained after the addition of ethylene oxide or propylene oxide to polyfunctional alcohol such as polyethylene glycol di acrylate (or methacrylate), trimethylolethane tri acrylate (or methacrylate), neopenthyl glycol acrylate (or methacrylate), pentaerythritol tri acrylate (or methacrylate), pentaerythritol tetra acrylate (or methacrylate), dipentaerythritol hexa acrylate (or methacrylate), hexanediol acrylate (or methacrylate), trimethylolpropane tri (acryloil oxypropyl) ether, tri (acryloiloxyethyl) isocyanelate, glycerin, or trimethylolethane, etc.; urethane acrylate, etc. described by Japanese Patents No. 48-41708, 50-6034, and 51-37193; polyester acrylate, etc. described by Japanese Patents No. 48-64183, 49-43191, and 52-30490; and polyfunctional acrylate or methacrylate such as epoxy acrylate, etc. obtained by the reaction of epoxy resin with acrylic (or methacrylate) acid.

In addition to the above, substances introduced as a light hardening monomer and an oligomer, can be also used. The quantity of the monomer or the oligomer to be used is 5 to 50% weight, and 10 to 40% weight is more preferable. Used as a photopolymerization initiator is, for example, a bicynal polyketoaldonyl compound disclosed by U.S. Pat. No. 2,367,660 which is hereby incorporated by reference, an α-carbonyl compound disclosed by U.S. Pat. Nos. 2,367,661 and 2,367,670 which are hereby incorporated by reference, acyloin ether disclosed by U.S. Pat. No. 2,448,828, an aromatic acyloin compound substituted by an α-hydrocarbon disclosed by U.S. Pat. No. 2,722,512 which is hereby incorporated by reference, a multi-nuclear quinone compound disclosed by U.S. Pat. Nos. 3,046,127 and 2,951,758 which are hereby incorporated by reference, a combination of triaryl imidazole dimer and p-aminophenyl ketone disclosed by U.S. Pat. No. 3,549,367 which is hereby incorporated by reference, a benzothiazole series compound/a trihalomethyl-s-triazone series compound disclosed by Japanese Patent 51-48516 which is hereby incorporated by reference, a photosensitive-s-triazone compound disclosed by Japanese Patent Application No. 61-186238 which is hereby incorporated by reference, a trihalomethyl-s-triazine series compound disclosed by U.S. Pat. No. 4,239,850 which is hereby incorporated by reference, and an oxadiazol compound disclosed by U.S. Pat. No. 4,212,976 which is hereby incorporated by reference. The quantity of the initiator to be used is approximately 0.2 to 20% weight of solid content, and 0.5 to 15% weight is more preferable.

To the binder polymer, a linear organic macromolecule polymer the side chains of which contain functional groups, for example, hydroxyl groups, amino groups, or amide groups required for adding the reactive dye and which is dissolved into a monomer, for example, hydroxyethyl acrylate, aminoethyl acrylate, or acrylamide homopolymer or copolymer; or a compound of acid anhydride and glycol or aminoglycol in which ester is locally formed, for example, maleic anhydride copolymer and anhydrous itaconic acid copolymer are useful. In the aspect of using the binder polymer, it is preferable that the polymer can be dissolved into an organic solution and developed by a weak alkaline solution. More concretely, when a polymer the side chain of which has carboxylic acid, for example, a methacrylic acid copolymer, an acrylic acid copolymer, and a crotonic acid copolymer, etc., which are disclosed by, for example, Japanese Patent Unexamined Published Application (PUPA) No. 59-44615, Japanese Pats. Nos. 54-34327, 58-12577, and 54-25957, Japanese PUPAs No. 59-53836 and 59-71048 which are all hereby incorporated by reference, are synthesized, it is possible to make the binder polymer soluble into the alkaline solution by the copolymerization of hydroxyethyl acrylate, amino ethyl acrylate, or acryl amide, etc. as the reactive group of the dye, the partial esterification of acid anhydride such as maleic anhydride copolymer or anhydrous itaconic acid copolymer and glycol or amino glycol, or the addition of anhydride such as itaconic acid, maleic acid, phthalic acid, or hydrous phthalic acid, etc. to the homopolymer or copolymer of hydroxyethyl acrylate, amino ethyl acrylate, or acryl amide.

Similarly, acidic cellulose derivative, etc. the side chain of which have carboxylic acids are useful.

Particularly, benzyl acrylate (or methacrylate)/hydroxyethyl acrylate (or methacrylate)/acrylic (or methacrylate) acid copolymer and styrene/hydroxyethyl acrylate (or methacrylate)/acrylic (or methacrylate) acid copolymer are preferable to others. In addition, as a soluble polymer, poly (vinyl pyrrolidone), polyethylene oxide, and poly (vinyl alcohol), etc. are useful. Further, to increase the intensity of a stiffened film coated, the addition of nylon soluble into alcohol or polyether formed from 2.2-bis (4-hydroxy phenyl)propane and epichlorhydrin is useful. These polymers may be formed by mixtures in any quantities, but it is not preferable in terms of the deterioration in the quality of picture images to be produced that over 90% polymers are formed. The 30 to 85% are ideal for the polymers.

In addition to the above, the addition of an inhibitor for thermal polymerization is preferable, and for example, hydroquinone, p-methoxyphenol, di-t-butyl-p-cresol, pyrogallol, t-butylcatechol, benzoquinone, 4.4'-thiobis (3-methyl-6-t-butylphenol), 2.2'-methylene (4-methyl-6-t-butylphenol), and 2-mercapto benzo imidazole, etc. are useful.

Monomers for sale usually contain a proper quantity of an inhibitor for thermal polymerization. To pigments added to said photosensitive composites, the pigments of, for example, azo compounds, anthraquinone, xanthine, quinacridone, indigo, dioxazine, indanthrone, isoindolinone series are useful, that is, for example, phthalocyanines blue (C.I. pigment blue 15:3, for example, Rionol blue-ES manufactured by Toyo Ink Mfg. Co. Ltd., Chromo blue-A3R manufactured by CIBA), phtalocyanine green (C.I. pigment green 7.36 or C.I. pigment green 37, for example, Rionol green 2YS manufactured by Toyo Ink Mfg. Co. Ltd.), berylene pigment (C.I. pigment red 155), and anthraquinone pigment (C.I. pigment red 177, for example, Rionogen red CD manufactured by Toyo Ink Mfg. Co. Ltd., Chromo PHTAL red BRN manufactured by CIBA), etc. are useful. Further, for color correction, it is very preferable that C.I. pigment yellow 83, C.I. pigment yellow 154, for example, Rionogen yellow 3G manufactured by Toyo Ink Mfg. Co. Ltd., and G.I. pigment violet 23 (for example, Rionogen violet RL manufactured by Toyo Ink Mfg. Co. Ltd.), are used. Said pigments disperse into said light-stiffened photosensitive composites so that coloring photosensitive composites can be formed. The percentage of each of said pigments occupying a photosensitive layer is 5 to 90% in the ratio of a solid and 10 to 60% are more preferable.

Each of said photosensitive composites is diluted with a solvent so that the concentration of the solution becomes 3to 70% or, in more preferable mode, 5 to 50%, and then is applied, by a usual method, to such a transparent substrate as a glass or a plastic substrate so that a dry film of 0.5 to 5 microns thickness is formed. To said solvent, glycol ether series, that is, methyl cellosolve, ethyl cellosolve, propyl cellosolve, propylene glycol methyl ether, propylene plycol ethyl ether, propylene glycol propyl ether, and their acetate series, that is, methyl cellosolve acetate, ethyl cellosolve acetate, propyl cellosolve acetate, propylene glycol methyl ether acetate, propylene glycol ethyl ether acetate, and propylene glycol propyl ether acetate are useful. For acetate ester series, amyl acetate, butyl acetate, propyl acetate, and ethyl acetate are useful. For ketone series, methyl isobutyl ketone, methyl ethyl ketone, acetone, cyclohexanone and in addition to above, dimethylformamide, dimethyl sulfoxide, methyl pyrrolidone, γ-butyrolactone, and lactic acid ethyl etc. are useful and their alkyl groups may be an isomer with a normal or a branched cain.

Still further, a fluorescent brightening agent for making colors brighter or the detergent of fluorine series as coating improvers may be added. As described above, a color filter formed according to the present invention has at least one coloring layer formed from a photosensitive composite containing a substance obtained by the reaction of the binder polymer with the reactive dye. In the preferred mode, a color filter of the present invention has a permeable coloring layer, which transmits red, blue, and green light and is formed on a transparent substrate, formed by a photosensitive composite containing a substance formed by the reaction of the binder polymer with the reactive dye, and pigment. In this case, it is preferable that the permeable coloring layer is formed between a black matrix on the transparent substrate. More concretely, the black matrix is formed as follows. First, a layer of photosensitive composite added with the black pigment of carbon black or black pigment which is a mixture of the pigment of red, blue, violet, and yellow is deposited on a transparent substrate such as glass. Patterns are exposed to light by usual masking, then through development the black matrix, that is, a light shielding layer is formed. The light shielding layer can also be formed by depositing a chromium layer on the transparent substrate, depositing a photoresist, exposing a pattern by usual mask, and developing the photoresist to remove the photoresist. Then the photosensitive permeable coloring layers of red, blue, and green are formed according to the present invention as follows. First, the photosensitive permeable coloring layer of the first color, for example red, of the three colours is deposited on an entire surface of the transparent substrate on which the above light shielding layer is formed, and then a PVA (Poly(Vinyl Alcohol) layer is deposited on the permeable coloring layer. The PVA layer has a function for blocking the coloring layer from oxygen and therefore, if there is no PVA layer, the coloring layer is exposed to oxygen in a process of the exposure to light and thereby a photochemical reaction, that is, stiffening process does not take place.

Then a mask, which has an aperture corresponding to a red color filter, is overridden and the exposing process takes place from the side of the mask, and thereby a part of the coloring layer of red which is exposed to light stiffens. The PVA layer and the remaining part of the coloring layer of red which is not exposed to light is removed in a developing process. The coloring layer of red then stiffens completely in a baking process at a temperature of 180 C. to 250 C. Secondly, the photosensitive permeable coloring layer of the second color, for example green, of the three colors is deposited on an entire surface of the transparent substrate on which the above red coloring layer is formed, and then the PVA layer is deposited on the permeable coloring layer. Then a mask, which has an aperture corresponding to a green color filter, is overridden and the exposing process takes place from the side of the mask, and thereby a part of the coloring layer of green which is exposed to light stiffens. Then the PVA layer and the remaining part of the coloring layer of green which is not exposed to light is removed in the developing process and the coloring layer of green stiffens completely in the above baking process. Finally, the photosensitive permeable coloring layer of, for example blue, of the three colors is deposited on an entire surface of the transparent substrate on which the above red and green coloring layers are formed and the PVA layer is deposited on the coloring layers. Then a mask, which has an aperture corresponding to a blue color filter, is overridden and the exposing process takes place from the side of the mask, and thereby a part of the coloring layer of blue which is exposed to light stiffens. Then the PVA layer and the remaining part of the coloring layer of blue which is not exposed to light is removed in the developing process and the coloring layer of blue stiffens completely in the baking process.

It is preferable that a thickness of the transparent glass substrate ranges from 0.7 mm to 1.1 mm. The thickness of 1.1 mm is very preferable. It is preferable that a thickness of the photosensitive permeable coloring layer ranges from 0.5 to 3 microns. The thickness of 2 microns is very preferable. If the thickness of the coloring layer is less than 0.5 microns, light passes excessively through the coloring layer and the color filter therefore does not fulfil its function, and on the other hand, if it becomes greater than 3 microns, light does not pass through the coloring layer at all and stiffening will become insufficient in the exposing process, and side etch is caused in the developing process and therefore desired patterns will not become obtained.

Common electrodes of ITO are deposited on an entire surface of the transparent substrate on which the red, the green, and the blue color filters are formed and a rubbing layer of polyimide is deposited throughout the ITO. Beneath the ITO, a protective layer made of acryl, urethane, epoxy, or polyimide, etc. can be attached. It is well known that indium or tin oxide is used as a layer of the electrodes attached to the transparent substrate. It is preferable that an ITO film of a desired thickness, for example, scores or thousands of angstrom (A) is formed in sputtering and the common electrodes are formed in pattering by a well-known method, if necessary.

A color filter of the present invention is most suitable for a TFT-LCD which needs especially high-contrast displaying and has the capability of gray scale display and can be discriminated remarkably against a conventional color filter as gray scale proceeds in the future. The red color filter of the present invention contains the organic pigment of primary red and the reactive dye of primary yellow and the green color filter contains the organic pigment of primary green and the reactive dye of primary yellow. It is preferable that the organic pigment of primary red is dianthraquinone, the organic pigment of primary green halo-Cu-phthalocyanine, and the reactive dye of primary yellow a monoazo compound. Those red and green filters are small in the degree of depolarization and therefore they make high contrast displays possible.

The present invention is further described by the following embodiment. First, to obtain conventional predetermined spectra, the following three kinds of dye-dispersed photopolymers/pigment-dispersed photopolymers were adjusted, besides they were adjusted through color matching simulation so that a color filter of the same chromaticity and transmittance as those of "color-matched green resist (pigment of green-pigment of yellow)" (hereinafter called CMR-green) and color-matched red resist (pigment of red-pigment of yellow)" (hereinafter called CMR-red), which are currently in use, can be formed. The photopolymers and the examples of their adjustment are as follows.

| Pigment-dispersed photopolymer (Primary red) | |
|---|---|
| Dianthraquinone (Red pigment) | 20 g |
| Benzil methacrylate/Hydroxyethyl methacrylate/ Methacrylic acid copolymer (Binder polymer) [Molar fraction 70/30, Average molecular weight $\Sigma w$ 20,000] | 60 g |
| Pentaerythritol tetracrylate (Monomer) | 33 g |
| Initiator for photopolymerization shown by the following chemical formula 2 | 2 g |

Chemical formula 2

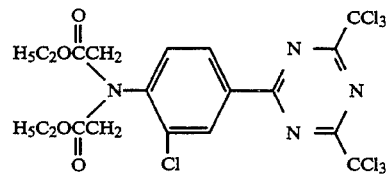

| | |
|---|---|
| Methoxy phenol (Inhibitor for thermal polymerization) | 16 mg |
| Cellosolve acetate | 550 g |
| Pigment-dispersed photopolymer (Primary green) | |
| Halo-Cu-phthalocyanine | 20 g |
| Benzil methacrylate/Hydroxyethyl methacrylate/ Methacrylic acid copolymer (Binder polymer) [Molar fraction 70/30, Average molecular weight $\Sigma w$ 20,000] | 60 g |
| Pentaerythritol tetracrylate (Monomer) | 33 g |
| Initiator for photopolymerization shown by the above chemical formula 2 | 2 g |
| Methoxy phenol (Inhibitor for thermal polymerization) | 16 mg |
| Cellosolve acetate | 550 g |
| Dye-dispersed photopolymer (Primary yellow) | |
| Monoazo compound (reactive yellow dye) methacrylate/Methacryl acid copolymer (Binder polymer) [Molar fraction 70/30, Average molecular weight $\Sigma w$ 20,000] | 20 g Benzil 62 g |
| Trimethylolpropane triacrylate (Monomer) | 38 g |
| Initiator for photopolymerization shown by the above | 2 g |

-continued

| chemical formula 2 | |
|---|---|
| Cellosolve acetate | 650 g |

Primary yellow is mixed with and dissolved into a solution, and the mixture is filtrated. The reactive yellow dye used is Sumifix Yellow R (C.I. Reactive Yellow 77) manufactured by Sumitomo Chemical Co., Ltd.

| Pigment dispersed photopolymer (New red) | |
|---|---|
| Primary red | 40 g |
| Primary yellow | 60 g |
| Dye/pigment dispersed photopolymer (New green) | |
| Primary green | 60 g |
| Primary yellow | 40 g |
| CMR-red | |
| Isoindolin | 2 g |
| Dianthrauqinone | 1.8 g |
| Benzil methacrylate/Methacryl acid copolymer (Binder polymer) [Molar fraction 70/30, Average molecular weight Σw 20,000] | 60 g |
| Pentaerythritol tetracrylate (Monomer) | 33 g |
| Initiator for photopolymerization shown by the above chemical formula 2 | 2 g |
| Methoxy phenol (Inhibitor for thermal photopolymerization) | 16 mg |
| Cellosolve acetate | 550 g |
| CMR-green | |
| Isoindolin | 3 g |
| Halo-Cu-phthalocyanine | 17 g |
| Benzil methacrylate/Methacryl acid copolymer (Binder polymer) [Molar fraction 70/30, Average molecular weight Σw 20,000] | 60 g |
| Pentaerythritol tetracrylate (Monomer) | 33 g |
| Initiator for photopolymerization shown by the above chemical formula 2 | 2 g |
| Methoxy phenol (Inhibitor for thermal photopolymerization) | 16 mg |
| Cellosolve acetate | 550 g |

The above photosensitive colored composite was dissolved into cellosolve acetate so that a concentration of 25% is reached, and it was deposited on the glass substrate by using a spin coaster so that its dry film has a thickness of 2 microns, and then was dried at a temperature of 85 C. for about five minutes. After cooling, the coating of a solution of PVA (poly(vinyl alcohol)) was done so that its dry film has a thickness of 1 micron to obtain a film of about 3 microns in total. The PVA which was used is a 5% solution in which the degree of saponification is 82% and the degree of polymerization is 500 and was dried, after coating, at a temperature of 85 C. for about five minutes.

Figure 2:
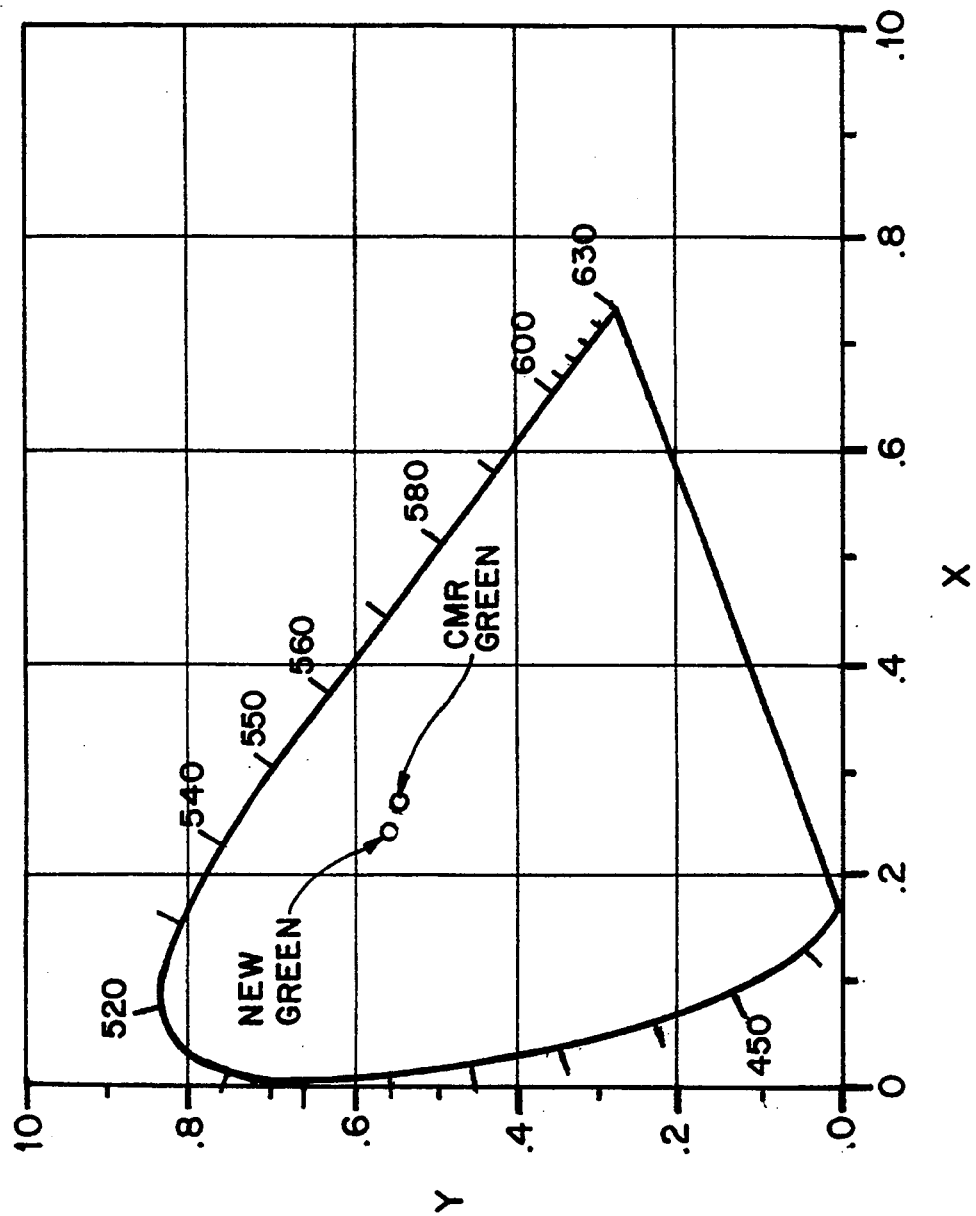
FIG. 2 illustrates a comparison of the chromaticity (x, y) of the color filter fabricated by using new green (the present invention) with that of the color filter fabricated by using CMR-green.
Figure 3:
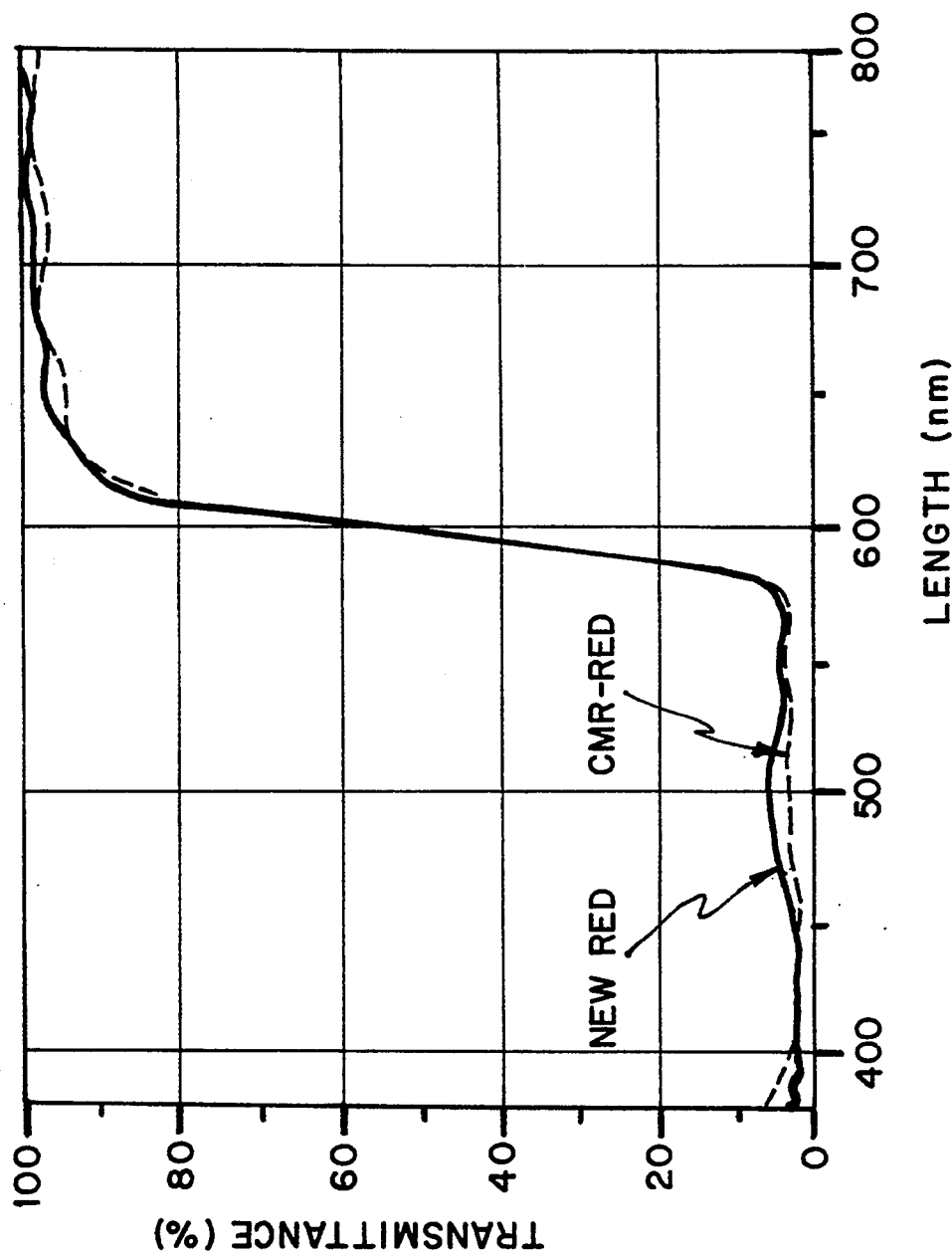
FIG. 3 illustrates a comparison of the spectrum of a color filter fabricated by using new-red (the present invention) with that of a color filter fabricated by using CMR-red.
Figure 4:
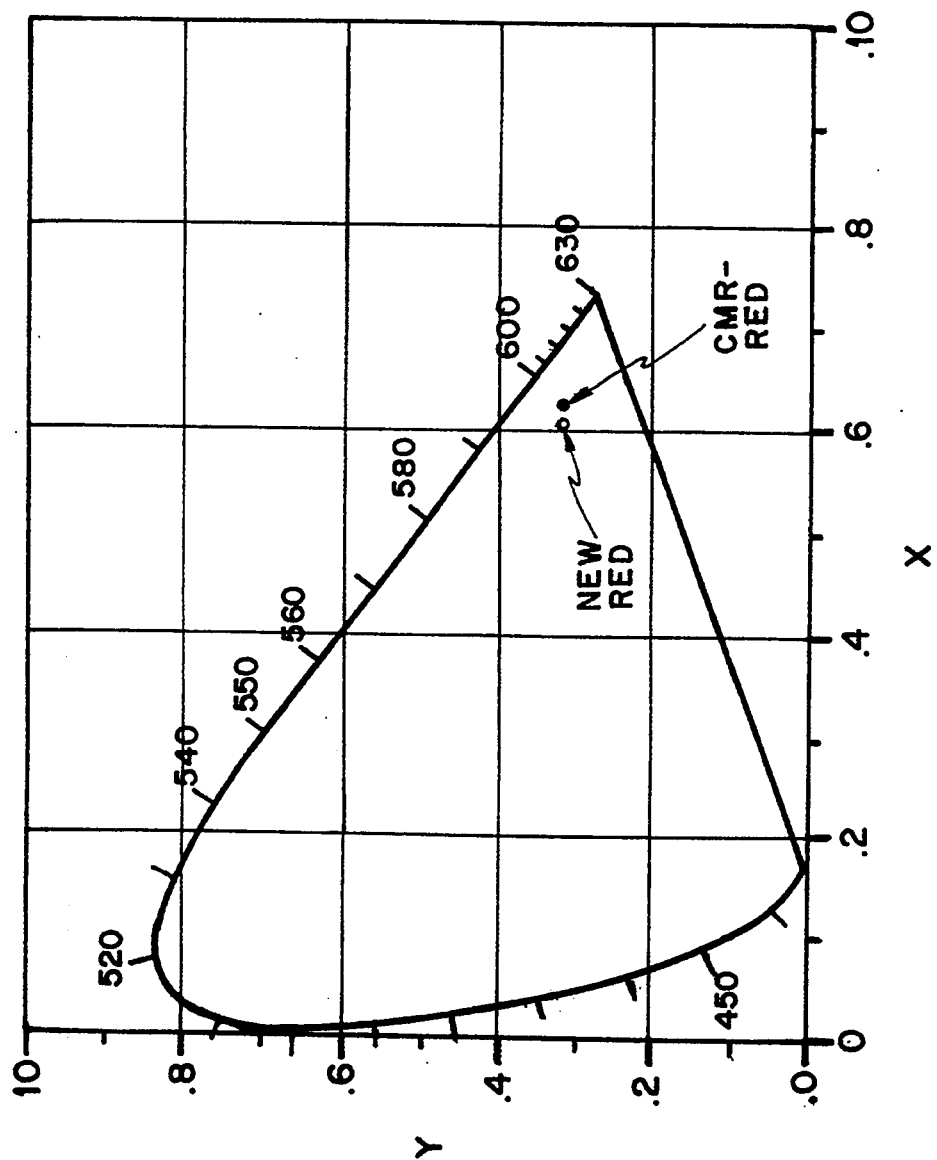
FIG. 4 illustrates a comparison of the chromaticity (x, y) of the color filter fabricated by using new-red (the present invention) with that of the color filter fabricated by using CMR-red.

Then the process of exposure to light from a 2 kw ultra-high-pressure mercury light was performed, through a mask, for five seconds. The process of development was made by a method of dipping into a 1% solution of sodium carbonate for one minute. The spectrum and the chromaticity (x, y) of the color filter thus fabricated by using CMR-green or new green are shown by FIG. 1 and FIG. 2, respectively. The spectrum and the chromaticity (x, y) fabricated similarly by using CMR-red or new red are shown by FIG. 3 and FIG. 4, respectively.

Figure 5:
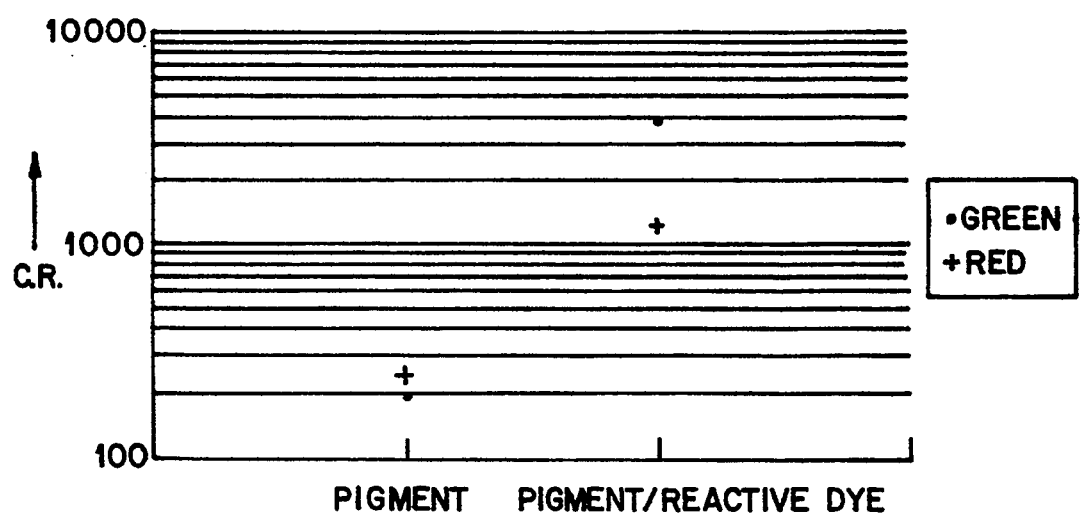
FIG. 5 illustrates a comparison of the contrast ratio of a color filter fabricated by using pigment/reactive dye (the present invention) with that of a color filter fabricated by using pigment.

Each of the above color filters was placed between two polarizing plates and the ratio (contrast ratio) of intensity in the case when two plates cross each other to one of the case where they are in parallel was measured under back light. Results are shown by Table 1 and FIG. 5.

TABLE 1

| | Comparison of contrast in both cases | | | |
|---|---|---|---|---|
| | Intensity (nit) in cross polarizing plates | Intensity (nit) in parallel polarizing plates | Contrast ratio | Thickness (μm) of film |
| Polarizing plate | 0.1605 | 1257 | 7830 | |

TABLE 1-continued

| | Comparison of contrast in both cases | | | |
|---|---|---|---|---|
| | Intensity (nit) in cross polarizing plates | Intensity (nit) in parallel polarizing plates | Contrast ratio | Thickness (μm) of film |
| CMR red | 0.7623 | 180.5 | 237 | 2.094 |
| New red | 0.2006 | 237.8 | 1190 | 3.248 |
| CMR green | 3.169 | 623.8 | 197 | 2.256 |
| New green | 0.1605 | 609.2 | 3800 | 3.162 |

From the above results, it is clear that a contrast ratio of about 200 for CMR-red or CMR-green, currently in use, in which the pigment of yellow is used, was remarkably improved by a method of the present invention in which the reactive dye of yellow is used, to a contrast ratio of 1200 or 3800, respectively.

Further, even if the above dye/pigment-dispersed photopolymer of one of three colors is deposited on the same kind of photopolymer of another color which has been post-baked, the dye in the post-baked photopolymer is not dissolved into the overcoated photopolymer. As described above, it is obvious that the color filters which use pigment and reactive dye as coloring materials satisfy spectral characteristics, make high contrast display possible.

While this invention has been particularly described and illustrated with respect to particular embodiments thereof, it will be understood by those skilled in the art that changes in the above description or illustrations may be made with respect to form or detail without departing from the spirit or scope of the invention.

We claim:

1. A color filter comprising:
    an organic pigment;
    a photosensitive composite having multifunctional or
        polyfunctional unsaturated monomers and an initiator for photopolymerization as a photosensitive additive; and a substance obtained by the reaction of a binder polymer with a reactive dye.

2. The color filter according to claim 1, wherein said organic pigment is dianthraquinone, halo-Cu-phthalocyanine, or Cu-phthalocyanine.

3. A red color filter comprising a photolithographically deposited layer which includes a substance obtained by the reaction of a binder polymer with a reactive dye of primary yellow, and an organic pigment of primary red.

4. The red color filter according to claim 3, wherein said organic pigment of primary red is dianthraquinone and said reactive dye of primary yellow is a monoazo-compound.

5. A green color filter comprising a photolithographically deposited layer which includes a substance obtained by the reaction of a binder polymer with a reactive dye of primary yellow, and an organic pigment of primary green.

6. The green color filter according to claim 5, wherein said organic pigment of primary green is halo-Cu-phtalocyanine and said reactive dye of primary yellow is a mono azo-compound.

7. A method for fabricating a color filter, comprising:

dissolving a binder polymer and a reactive dye to form a dye-dispersed composite;

combining said dye-dispersed composite with an organic pigment, a multifunctional or polyfunctional unsaturated monomer, and a photopolymerization initiator to form a photosensitive composite;

applying said photosensitive composite to a transparent substrate; and heating either said dye-dispersed composite or said photosensitive composite to bond said binder polymer with said reactive dye.

8. A high-contrast color LCD filter having a coloring layer formed from a mixture comprising:

an organic pigment;

a photosensitive composite having multifunctional or polyfunctional unsaturated monomers and a photopolymerization initiator; and a substance obtained by the reaction of a binder polymer with a reactive dye.

9. A high-contrast color LCD filter having a photolithographically deposited layer comprising:

a substance obtained by the reaction of a binder polymer with a reactive dye; and an organic pigment.

10. A high-contrast color LCD filter according to claim 9 wherein said reactive dye is a yellow dye.

* * * * *